No. 884,494. PATENTED APR. 14, 1908.
W. F. KERR.
CLAMP FOR CARRYING BRICKS BY HAND.
APPLICATION FILED DEC. 21, 1907.
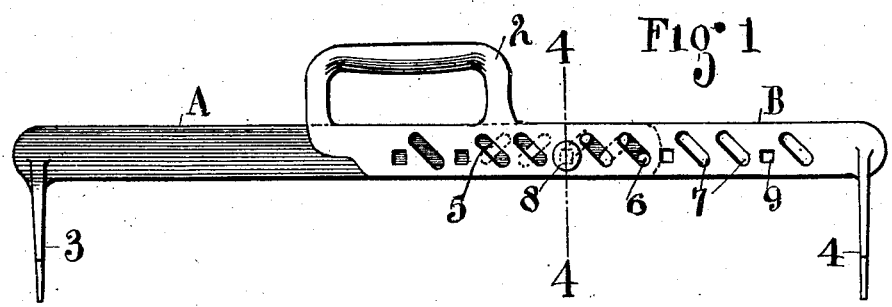
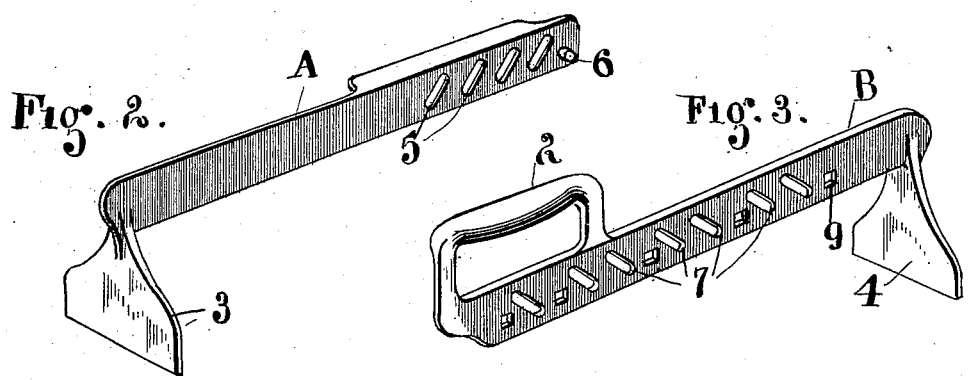
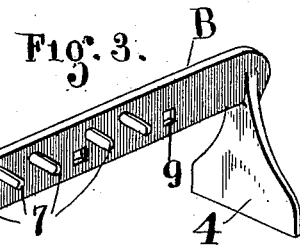
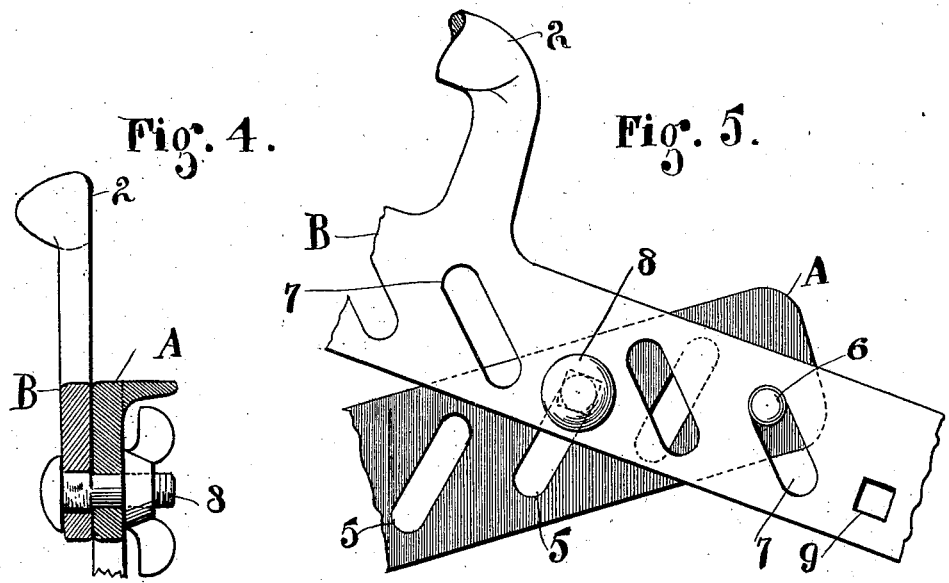
ATTEST
E. M. Fisher
F. C. Massum
INVENTOR
William F. Kerr.
BY Fisher & Moser ATTYS

UNITED STATES PATENT OFFICE.

WILLIAM F. KERR, OF CLEVELAND, OHIO, ASSIGNOR TO FREDERICK H. JACKSON, OF CLEVELAND, OHIO.

CLAMP FOR CARRYING BRICKS BY HAND.

No. 884,494.  Specification of Letters Patent.  Patented April 14, 1908.

Application filed December 21, 1907. Serial No. 407,526.

*To all whom it may concern:*

Be it known that I, WILLIAM F. KERR, a citizen of the United States, residing at Cleveland, in the county of Cuyahoga and State of Ohio, have invented certain new and useful Improvements in a Clamp for Carrying Bricks by Hand, and do declare that the following is a full, clear, and exact description of the invention, which will enable others skilled in the art to which it appertains to make and use the same.

My invention relates to a clamp for carrying bricks by hand, and the invention consists in a clamp having two substantially equal members pivotally and slidably joined, all substantially as shown and described and particularly pointed out in the claims.

In the accompanying drawings, Figure 1 is a side elevation of my improved clamp. Figs. 2 and 3 are perspective views of the respective members or parts of the clamp. Fig. 4 is a cross section on line 4—4, Fig. 1, and Fig. 5 is a side elevation of the two overlapping ends of the clamp members, showing the respective positions thereof when at their extreme limit in the respective slots.

The invention as thus shown comprises two members, A and B respectively having flat sides resting one against the other, and the said members are operatively connected in such manner that with a minimum upward movement of handle 2 of member B a maximum clamping effect is obtained upon the jaws 3 and 4. To these ends I provide the shank of member A with a series of transversely inclined slots 5 running from the outer end thereof inward and equally spaced apart, and with a fixed lug, stud, or pin 6 at its extremity and side and at the lower edge thereof outside said slots. The shank of handle member B is provided with a series of oppositely inclined transverse slots 7, which, when brought into position opposite the slots 5 in member A, sustain a substantially right angle thereto, as clearly seen in Fig. 1.

The pin or projection 6 is designed to work in any one of the slots 7 to which it may be adjusted, and a bolt 8 is entered through one of the angular holes 9 in bar B arranged at intervals between slots 7 and slots 5 in bar A, according to adjustment or relative length the device is to have for a given use. The extreme limits of adjustment or of elongation and contraction of the clamp are governed by the location primarily of connecting bolt 8 and pin 6 through said parts, and the clamp as a whole may be shortened or lengthened within all the requirements of a tool or instrument of this kind. Ordinarily a medium length, or with the parts coupled up relatively as in Fig. 1, gives the clamp a good working size.

Now a distinguishing and novel feature of this device over others familiar to me is in the manner of connecting and operating the same, whereby I obtain a compound pivotal and longitudinal movement when the parts are engaged for carrying. Thus, Fig. 1 shows normal relations of the parts ready for use, and when the device is placed over a row of bricks and lifted by handle 2 it will flex somewhat, the extreme position or possibility of which is shown in Fig. 5 in which pin 6 and bolt 8 have run the limits of their respective slots. In passing from Fig. 1 to Fig. 5, the bolt 8 travels in the corresponding slot 5 in exactly the same measure as pin or lug 6 travels in slot 7 in the opposite member, and both bolt and pin slide in the same direction in the same proportion. In this movement there is no pivot as such on which one member swings in the arc of a circle on the other but a longitudinal travel of the members in respect to each other within the confines of the inclined slots 5 and 7. In flexing the device the two parts run lengthwise apart in proportion to their travel in the inclined slots, so that the entire device would seem to be correspondingly lengthened between the jaws 3 and 4, but this does not in fact occur at the jaws because they approach each other on arcs of circles from the respective points of their connection by reason of the bend between them. Ordinarily the device is adjusted to what is to be carried so that when the clamp is set down over the bricks and a lift made upon the handle, the rise of the handle will be comparatively slight, and the inward pressure of the jaws against the sides of the bricks will at the same time be thoroughly effective.

What I claim is:—

1. A device of the class described having two gripping members provided with transversely inclined slots at substantially right angles to each other in the respective members, and a plurality of engagements between said members working in said slots.

2. A brick carrying clamp consisting of two members having flat shanks side by side, reversely inclined slots in said shanks respectively, a connecting bolt in one shank and a lug on the extremity of the other shank adapted respectively to work in a slot in the opposite shank.

3. A device to carry bricks comprising two members having flat shanks provided each with substantially transverse slots oppositely disposed, and one of said shanks having bolt holes between slots at intervals, and a bolt connecting said shanks through a hole in one shank and a slot in the other.

4. A clamp to carry bricks comprising two members having gripping jaws and flat shanks adapted to lie one against the other and having oppositely inclined transverse slots running in series to their inner ends, a fixed lateral projection on one of said shanks engaged in a slot in the opposite shank and a connecting bolt having a fixed seat in one of said shanks and engaged through a slot in the opposite shank, and a handle on one of said shanks to lift the clamp.

5. A brick clamp consisting of two members having transversely inclined slots and a projection in each member engaged in a slot in the opposite member, one of said projections removably connecting said parts.

6. A clamp to carry bricks comprising two members having gripping jaws at opposite ends and oppositely disposed transversely inclined slots between their ends, and two different working engagements between said members slidable in opposite slots respectively.

In testimony whereof I sign this specification in the presence of two witnesses.

WILLIAM F. KERR.

Witnesses:
 R. B. MOSER,
 F. C. MUSSUN.